United States Patent
Larsson et al.

(10) Patent No.: US 9,597,950 B2
(45) Date of Patent: Mar. 21, 2017

(54) TRACTION SYSTEM AND A METHOD FOR CONTROLLING SAID TRACTION SYSTEM

(75) Inventors: Lena Larsson, Västra Frölunda (SE); Jan Öberg, Göteborg (SE); Filip Alm, Bohus (SE)

(73) Assignee: Volvo Lastvagnar AB, Göteborg (SE)

( * ) Notice: Subject to any disclaimer, the term of this patent is extended or adjusted under 35 U.S.C. 154(b) by 33 days.

(21) Appl. No.: 14/399,538

(22) PCT Filed: May 8, 2012

(86) PCT No.: PCT/EP2012/001974
§ 371 (c)(1),
(2), (4) Date: Nov. 10, 2014

(87) PCT Pub. No.: WO2013/167148
PCT Pub. Date: Nov. 14, 2013

(65) Prior Publication Data
US 2015/0081190 A1     Mar. 19, 2015

(51) Int. Cl.
*B60K 6/12*     (2006.01)
*B60K 6/08*     (2006.01)
(Continued)

(52) U.S. Cl.
CPC .................. *B60K 6/12* (2013.01); *B60K 6/00* (2013.01); *B60K 6/08* (2013.01); *B60K 7/0015* (2013.01);
(Continued)

(58) Field of Classification Search
CPC ... B60K 6/00; B60K 6/08; B60K 6/12; B60K 7/0015; B60W 20/10; B60W 2530/20
See application file for complete search history.

(56) References Cited

U.S. PATENT DOCUMENTS 4,236,595 A    12/1980   Beck et al.
4,402,377 A *   9/1983   Brooks .................. B60K 17/10
                                              180/242

(Continued)

FOREIGN PATENT DOCUMENTS

DE    102008044303 A1    6/2010

OTHER PUBLICATIONS

International Search Report (Jan. 18, 2013) for corresponding International Application PCT/EP2012/001974.
(Continued)

*Primary Examiner* — Dale W Hilgendorf
(74) *Attorney, Agent, or Firm* — WRB-IP LLP

(57) ABSTRACT

In a method for controlling a traction system for a heavy road vehicle, the system includes a first mechanical propulsion system, a second hydraulic propulsion system, and a control unit. The method includes measuring a first parameter value, indicative of the rolling radius of a first traction wheel, measuring a second parameter value, indicative of the rolling radius of a second traction wheel, and the control unit using the first and second parameter values for determining a present relation between the rolling radii of the first and second traction wheels. The control unit provides an output signal based on the present relation to optimize the traction applied to the second traction wheel. A traction system and a heavy vehicle incorporating a traction system are also provided.

17 Claims, 2 Drawing Sheets

(51) Int. Cl.
*B60K 6/00* (2006.01)
*B60K 7/00* (2006.01)
*B60K 23/08* (2006.01)
*B60K 28/16* (2006.01)
*B60K 17/356* (2006.01)
*B60K 17/10* (2006.01)

(52) U.S. Cl.
CPC ........ *B60K 23/0808* (2013.01); *B60K 28/165* (2013.01); *B60K 17/10* (2013.01); *B60K 17/356* (2013.01); *B60W 2520/263* (2013.01); *B60W 2530/20* (2013.01); *B60Y 2200/44* (2013.01)

(56) References Cited

U.S. PATENT DOCUMENTS

| | | | | |
|---|---|---|---|---|
| 4,635,743 | A * | 1/1987 | Riehl | B60K 17/356 180/243 |
| 5,147,010 | A * | 9/1992 | Olson | B60K 23/0808 701/69 |
| 5,168,955 | A * | 12/1992 | Naito | B60K 23/0808 701/89 |
| 5,368,120 | A * | 11/1994 | Sakai | B60K 17/356 180/243 |
| 5,564,519 | A * | 10/1996 | Katoh | B60K 23/0808 180/197 |
| 5,694,321 | A * | 12/1997 | Eckert | B60W 30/02 701/91 |
| 5,771,479 | A | 6/1998 | Yamamoto et al. | |
| 5,775,453 | A | 7/1998 | Williams et al. | |
| 5,927,425 | A * | 7/1999 | Kusano | B60K 23/0808 180/248 |
| 5,959,202 | A | 9/1999 | Nakajima | |
| 6,024,182 | A * | 2/2000 | Hamada | B60K 17/356 180/243 |
| 6,148,269 | A | 11/2000 | Kumar et al. | |
| 6,313,742 | B1 | 11/2001 | Larson | |
| 6,422,333 | B1 | 7/2002 | Kjaer et al. | |
| 6,438,480 | B2 * | 8/2002 | Tanaka | B60K 23/0808 701/69 |
| 6,892,846 | B2 * | 5/2005 | Mellot | B60K 17/356 180/243 |
| 7,549,499 | B2 * | 6/2009 | Delaney | B60K 17/356 180/243 |
| 7,890,230 | B2 * | 2/2011 | Tsukasaki | B60K 23/0808 701/74 |
| 8,165,750 | B2 * | 4/2012 | Tsukasaki | B60K 23/0808 701/70 |
| 2005/0189886 | A1 * | 9/2005 | Donnelly | B60T 8/1705 318/52 |
| 2005/0228570 | A1 | 10/2005 | Sandberg | |
| 2006/0273657 | A1 * | 12/2006 | Wanke | B60T 8/17555 303/146 |
| 2010/0114428 | A1 | 5/2010 | Kurata et al. | |
| 2011/0257851 | A1 * | 10/2011 | Uematsu | B60W 10/14 701/50 |

OTHER PUBLICATIONS

International Preliminary Report on Patentability (Apr. 10, 2014) for corresponding International Application PCT/EP2012/001974.

* cited by examiner

TRACTION SYSTEM AND A METHOD FOR CONTROLLING SAID TRACTION SYSTEM

BACKGROUND AND SUMMARY

The present invention relates to a traction system for heavy road vehicles, said traction system comprising a mechanical first propulsion system and a hydraulic second propulsion system.

The present invention also relates to a method for controlling said traction system.

The present invention also relates to a heavy road vehicle comprising said traction system.

As is well known among drivers of heavy road vehicles, it is sometimes desirable to optimize the front wheel speed to current driving conditions. For example, a higher front wheel speed is desirable when the vehicle is driving in sand and front wheel slip is used to remove the sand piling up in front of the front wheel. In other situations, it may be desirable to try to avoid slip, e.g. when driving on grass where minimum slip is desirable so as to not destroy the grass roots.

One solution to this problem is to use two independently controlled propulsion systems, one for the rear wheels, suitably a mechanical propulsion system, and one for the front wheels, suitably a hydraulic propulsion system. Such an arrangement makes it possible to adapt the relation between the wheel speeds of the two propulsion systems to the current driving conditions.

A traction system comprising two propulsion systems is described in EP 1 886 861.

However, even systems comprising two propulsion systems sometimes fail to provide accurate traction to the wheels.

Consequently, there is a demand for an improved system, which provides improved wheel slip control.

It is desirable to provide an improved traction system for heavy road vehicles, which traction system provides improved wheel slip control.

It is desirable to provide a method for controlling said improved traction system such that improved wheel slip control is achieved.

It is desirable to provide a heavy road vehicle with improved wheel slip control.

A traction system according to an aspect of the invention comprises a first, mechanical propulsion system, which comprises at least one first traction wheel, and a second, hydraulic propulsion system, which comprises at least one second traction wheel. The traction system further comprises a control unit for controlling traction applied to the second traction wheel.

A method according to an aspect of the invention comprises the steps of measuring at least a first parameter value by means of a first sensor, which first parameter value is indicative of the rolling radius of said first traction wheel, and transmitting said first parameter value to said control unit. The method further comprises the step of measuring a second parameter value by means of at least one second sensor, which second parameter value is indicative of the rolling radius of said second traction wheel, and transmitting said second parameter value to said control unit. The method also comprises the step of said control unit using said first and second parameter values for determining a present relation between the rolling radii of said first and second traction wheels. Thereafter, the control unit provides an output signal (to the hydraulic propulsion system) to optimize the traction applied to said second traction wheel. The output signal is based on the present relation between the rolling radii of the first and second traction wheels.

The second propulsion system may comprise more than one second traction wheel, and the control unit may provide one or more output signals to optimize one or more traction(s) in the second propulsion system. The same traction can be applied to more than one second traction wheel.

The perimeter of a traction wheel will not be a perfect circle when the traction wheel is mounted on a heavy road vehicle. The part of the perimeter in contact with the ground will be flattened and the radius of the traction wheel will be shorter within this part of the traction wheel. The rolling radius is defined as the radius of a perfect circle having a circumference as long as the distance coveted in one complete revolution of the (flattened) wheel.

The rolling radius of a traction wheel will change over time, as a consequence of for example, reduced tire pressure and tire wear. More importantly, the change in rolling radii will differ from wheel to wheel. As a consequence thereof, the relation between the rolling radii of the first and second traction wheels will change over time. The state of the art systems do not take this change into account. The result is non-optimal traction adjustment, which can cause undesired wheel slip, a problem solved by the present invention.

As mentioned above, the method according to the present invention comprises the steps of measuring at least one first parameter value indicative of the rolling radius of a first traction wheel (in the mechanical propulsion system) and at least one second parameter value indicative of the rolling, radius of at least one second traction wheel (in the hydraulic propulsion system). Examples of suitable first and second parameters are gross weight, tire pressure, drive torque and wheel speed. Tire pressure is related to the rolling radius of a traction wheel. A traction wheel with high tire pressure will have a long rolling radius and a traction wheel with low tire pressure will have a short rolling radius. The wheel speed is also related to the rolling radius, because the rolling radius is related to the circumference of the traction wheel and thus the distance covered when the traction wheel rotates one full revolution. Gross weight and drive torque are also related to the rolling radius of the traction wheel.

The first and second parameter values are transmitted to the control unit. The control unit, having received said first and second parameter values, calculates a present relation between the first and second parameter values.

The calculated relation between the first and second parameter values is indicative of the present relation between the rolling radii of the first and second traction wheels. Hence, the present relation between the rolling radii of the first and second traction wheels may be deduced from a single measurement, assuming that the measured parameter(s) is directly implying the relative rolling radius. One may for example measure the number of revolutions for each wheel during a certain distance. To be noted, it is not essential to know the exact distance which the vehicle has travelled but rather the comparative number of revolutions for the wheels, e.g. if one wheel performs 99 revolutions while another wheel performs 100 revolutions on the same distance (when travelling straight ahead), the relative rotational speed is given directly without knowing the distance travelled.

The calibration is advantageously performed when travelling straight on a road while using only one of the traction systems, e.g. the mechanical traction system. However, the calibration may be performed while turning as well, if the measurements compensate for the different lengths travelled by the traction wheels. It is also possible to measure the parameter values when the hydraulic propulsion system is active and compare these to previously measured parameter values, preferably measured when the hydraulic propulsion system was inactive.

The present relation between the rolling radii of the respective traction wheels can also be determined based on a previous value of the relation between the rolling radii. In this case, the present relation is compared to a previous relation between the rolling radii of said first and second traction wheels. This comparison provides an indication of how the relation between the rolling radii of the first and second traction wheels has changed. This may for example be the case if there is a sudden, rather large change in the tire pressure, for example the release of tire pressure from one or more traction wheels in order to improve traction on loose or slippery ground, or when an empty load carrying truck is loaded. In this case, the impact on the relative rolling radius of each wheel can be decided based on the previous value of the relative rolling radius and the predicted change of rolling radius when changing the tire pressure and/or load condition of the vehicle. The expected rolling radius of each wheel having certain tire pressure and the load dependence could of course also be estimated from generalized standard look-up tables. Another example of when change of rolling radii can happen is when tires are changed to another type of tires, having a different rolling radius.

The control unit uses this information to determine the traction to be applied to the second traction wheel. The traction should be modified so that the desired slip level (including no slip at all) or wheel speed is achieved. An output signal is transmitted to the hydraulic propulsion system, and the traction applied to the second traction wheel is adjusted accordingly. In other words, the present invention allows for taking into account a change in rolling radius when optimizing the traction applied to the second traction wheel in the hydraulic propulsion system. Thus, it becomes possible to optimally adjust the wheel slip to the current driving conditions.

In an alternative embodiment, the control unit may compare said present relation between the rolling radii of the first and second traction wheels to a previous relation between the rolling radii of said first and second traction wheels, to determine how the relation between the rolling radii of the first and second traction wheels has varied over time. This information can be used to accurately determine the traction to be applied to the second traction wheel.

In alternative embodiments, the control unit may optimize one or more tractions in the mechanical propulsion system in addition to or instead of optimizing one or more tractions in the hydraulic propulsion system. However, it is usually easier to adapt the hydraulic propulsion system to a change in driving conditions.

It is possible to use additional sensors to measure first or second parameter values related to other traction wheels. It is also possible to program the control unit to calculate a mean value of said first and/or second parameter values.

The control unit may compare, for example, the wheel speed of a second traction wheel in the hydraulic propulsion system to a mean wheel speed of a plurality of first traction wheels in the mechanical propulsion system. Alternatively, the control unit may compare a mean wheel speed of a plurality of second traction wheels to the wheel speed of a single first traction wheel. The control unit may also compare the wheel speeds of individual first and second traction wheels, as well as compare mean wheel speeds of a plurality of first and second traction wheels. The same goes for other types of parameters, e.g. drive torque and tire pressure.

As mentioned above, it is possible to apply the same optimized traction more than one traction wheel.

Sometimes, it is desirable to know the rolling radius of a traction wheel. In this case, the control unit is programmed to calculate the present rolling radius of a traction wheel, starting from a previous, known rolling radius, stored on the control unit or another suitable storing means, and taking into account the change in rolling radius. It is also possible to determine a present rolling radius to calculate a new traction to be applied to one or more of the traction wheels. In a similar manner, it is possible to calculate a mean rolling radius of a plurality of traction wheels. Note that in state of the art systems, it is often assumed that the rolling radius of a traction wheel remains constant over time. This error is corrected in the present invention by taking into account an eventual change in rolling radius when calculating the traction (s) to be applied to the traction wheels.

It is advantageous to use more than one parameter (gross weight, tire pressure, wheel speed, drive torque etc.) in the method according to the invention, since this will provide a more accurate result.

It may also be advantageous to calibrate the traction or wheel speed (or any step in the process for determining these) to be applied to a traction wheel with respect to, for example, the steering angle of the traction wheel. The traction wheels of a vehicle will not travel the same distance when the vehicle is turning. This will change the rotational speeds of the traction wheels and is advantageously taken into consideration.

The second propulsion system is a hydraulic propulsion system. Advantageously, the hydraulic, propulsion system comprises at least two second traction wheels, each traction wheel drivingly connected to a respective hydraulic wheel motor. The hydraulic propulsion system further comprises a hydraulic pump for powering said hydraulic wheel motors, which hydraulic wheel motors are arranged to provide traction to said second traction wheels. A first conduit connects said hydraulic wheel motors, said first conduit being in fluid connection with said hydraulic pump by means of a second conduit. A third conduit also connects said hydraulic wheel motors, said third conduit being in fluid connection with said hydraulic pump by means of a fourth conduit. The hydraulic propulsion system could also be a single hydraulic motor adapted to propel a common axle for two wheels.

Obviously, the invention is not limited to this particular design of the hydraulic propulsion system. The method advantageously comprises the step of transmitting output signals from the control unit to the hydraulic pump to optimize traction applied to the second traction wheels (and possibly additional second traction wheels) in the hydraulic propulsion system. An output signal sent to the hydraulic pump can be transmitted via an intermediate means, which may process the information in said output signal.

The mechanical and hydraulic propulsion systems may comprise other features in addition to those mentioned above. For example, the hydraulic propulsion system may comprise a plurality of sensors of different types e.g. indicating flow rate, speed or pressure, and/or wheel brakes.

The hydraulic propulsion system may also comprise at least one control valve, possibly connected to the first and/or third conduits, for controlling the pressure in said hydraulic wheel motor.

Advantageously, the hydraulic propulsion system comprises a plurality of control valves. The control valves can be connected to the first and/or third conduits. Such control valves are arranged to control the flow of fluid to or from a respective hydraulic wheel motor. The control valves are connected to and controlled by the control unit, and allow the control unit to regulate the pressure in the wheel motors individually.

One advantage with these arrangements is that it becomes possible to individually control the traction applied to each traction wheel.

Throughout this application, the term "heavy road vehicle" refers to a vehicle with a weight of about 10 tons or more and designed tot on-road use. A heavy road vehicle is adapted to transport humans or cargo. Heavy trucks and buses are examples of heavy road vehicles.

The traction system comprises a first mechanical propulsion system and a second hydraulic, propulsion system. The mechanical propulsion system comprises at least one first traction wheel and a mechanical drivetrain including an internal combustion engine, which provides traction to said first traction wheel via a gear box. The hydraulic propulsion system comprises at least one second traction wheel. The traction system further comprises a control unit for controlling traction applied to the second traction wheel. The control unit is adapted to receive a first parameter value from at least one first sensor, which first parameter value is indicative of the rolling radius of said first traction wheel, and a second parameter value from at least one second sensor, which second parameter value is indicative of the rolling radius of said second traction wheel. The control unit is further adapted to use said first and second parameter values for determining a present relation between the rolling radii of said first and second traction wheels. Finally, the control unit is adapted to provide an output signal based on the rolling radii of said first and second traction wheels fir optimizing the traction applied to said second traction wheel.

As mentioned above, the distance a traction wheel travels in one revolution depends on the rolling radius of the traction wheel. The rolling radius of the traction wheel depends on, among other things, the load applied to the traction wheel. A heavy load will deform the traction wheel more than a light load. The rolling radius also depends on other factors, e.g. tire pressure and tire wear. In other words, the rolling radius will not remain constant over time.

The present invention is advantageous in that it identifies a change in the relation between the rolling radii of the first and second traction wheels, and in that the control unit takes this change into account when it calculates the traction to be applied to the traction wheel (s) in the hydraulic propulsion system. The traction system and method disclosed herein are capable of handling a reduction as well as an increase in rolling radius (an increase may occur, for example, when the load is removed or when the tire pressure is increased).

In one advantageous embodiment, the traction system comprises at least one additional first sensor for measuring a first parameter value indicative of the rolling radius of an additional first traction wheel. The control unit may be adapted to calculate and use a mean value of said first parameter values in said comparison. The traction system may additionally or alternatively comprise at least one additional second sensor for measuring a second parameter value indicative of the rolling radius of an additional second traction wheel, in which case the control unit may be adapted to calculate and use a mean value of said second parameter values in said comparison.

As mentioned above, the optimized traction can be applied to more than one second traction wheel.

It is usually easier to adjust the traction applied by the second hydraulic propulsion system. However, in alternative embodiments, it is possible to adjust the mechanical propulsion system.

As mentioned above, the adjustment of the traction is executed in response to a change in the relation between the rolling radii of the first and second traction wheels. Consequently, it is important to determine this change as precisely as possible. Using a single first traction wheel as reference wheel in the comparison may be advantageous in some ways (less parameters to consider and less sensors required), but may also affect the reliability of the comparison negatively. The first traction wheel may, for example, experience a sudden loss in tire pressure (in comparison with the other first traction wheels), resulting in a shorter rolling radius. By including a plurality of first parameter values, indicative of the rolling radii of a plurality of first traction wheels, and calculating a mean first parameter value to be used in the comparison, a higher reliability is achieved. It is also possible to exclude parameter values that deviate too much from an expected value or a mean value.

It is possible to adjust the traction applied to each second traction wheel individually, for improved accuracy. However, it may be easier to apply the same traction to a plurality of second traction wheels. In the latter case, it is advantageous to measure a plurality of second parameter values, indicative of the rolling radius of at least some of these second traction wheels, and to use a mean second parameter value in the comparison.

Finally, any number of first and second parameter values can be used in the comparison. It is possible to use a single first parameter value or a mean first parameter value in said comparison. Likewise, it is possible to use a single second parameter value or a mean second parameter value in said comparison.

It is also possible to measure parameters of different types, indicative of the rolling radius of the same traction wheel, and to use a plurality of parameters related to the same traction wheel when determining the traction to be applied to a traction wheel.

At least one first and second parameter can relate to the wheel speed, load, tire pressure or drive torque of a traction wheel.

The second system is a hydraulic propulsion system. In one particular advantageous embodiment, the hydraulic propulsion system comprises at least two second traction wheels, each traction wheel drivingly connected to a respective hydraulic wheel motor, and a hydraulic pump for powering said hydraulic wheel motors. The pump is connected to said hydraulic wheel motors by means of first and second conduits, the first conduit connecting said hydraulic wheel motors and the second conduit connecting said first conduit to said hydraulic pump. The hydraulic wheel motors are also connected by means of a third conduit, which in turn is connected to the hydraulic pump by means of a fourth conduit. Fluid may be pumped through the conduits in any direction. The parallel arrangement of the hydraulic wheel motors, provided there are no control valves or restrictions, ensures that the pressure is the same in both hydraulic wheel motors. One advantage with this arrangement is that there will be automatic compensation for different rolling radii of the second traction wheels. For example, during cornering, the same pressure will be present in both hydraulic wheel motors and the same torque will be provided to both second traction wheels.

In order to avoid a sudden pressure drop in the wheel motors, the wheels are preferably provided with wheel brakes, arranged to provide resistance to the hydraulic wheel motors in case of wheel spin.

The control unit is arranged to provide output signals to said hydraulic pump, which in turn, based on these output signals, regulate the flow of fluid to and from said wheel motors and thus the traction applied to said second traction wheels.

One advantageous embodiment relates to a solution capable of optimizing the tractions applied to the second traction wheels individually. The solution is to provide the first and/or third conduits with control valves, each control valve arranged to regulate the fluid pressure in a respective wheel motor. The control valves are controlled by the control unit.

It is understood that the traction systems described in this application may comprise more than one mechanical propulsion system, as well as more than one hydraulic propulsion system. It is also understood that both systems can comprise front and/or rear wheels (driven or non-driven).

Connected parts can be directly connected to each other or connected via intermediate means. Intermediate means may process the information in an output signal sent from one part to another part.

The method provides improved control over the active hydraulic propulsion system. The hydraulic propulsion system can be manually activated, e.g. when extra traction or wheel slip is desired. The hydraulic propulsion system can also be arranged to be automatically activated in response to identification of certain driving conditions. The hydraulic propulsion system is usually activated under certain driving conditions, e.g. when driving on sand or soft ground.

The first and second parameter value are preferably, although not necessarily, measured when driving at low torque and in a straight line. The relation between the rolling radii of the first and second traction wheels is advantageously calculated before the hydraulic propulsion system is activated, and the relation is used to adapt the traction (s) applied by the hydraulic propulsion. It is also possible to establish more than one relation (at different times) and compare these relations to one another to determine a variation in the relation between the rolling radii of the first and second traction wheels.

In some embodiments, output signals are only sent when the difference between the present and previous relations exceeds a predetermined value or threshold.

The heavy road vehicle can comprise means for alerting the driver of the vehicle that a substantial change in rolling radius of one of the wheels has occurred. Advantageously, the driver is informed of which wheel it is. Even more advantageously, the driver is informed of the current rolling radius of said traction wheel, and/or the tire pressure and/or amount of wear of said traction wheel.

Systems for detection of a variation in wheel diameters and correction systems are known from, for example, US 20100114428, U.S. Pat. No. 5,959,202, US 20050228570, U.S. Pat. No. 6,313,742 and U.S. Pat. No. 6,148,269. A propulsion system having separately electrically driven rear and front wheels is shown in DE 10 2008 044 303.

BRIEF DESCRIPTION OF THE DRAWINGS

The invention will now be described with reference to the accompanying drawings, in which.

DETAILED DESCRIPTION

Figure 1:
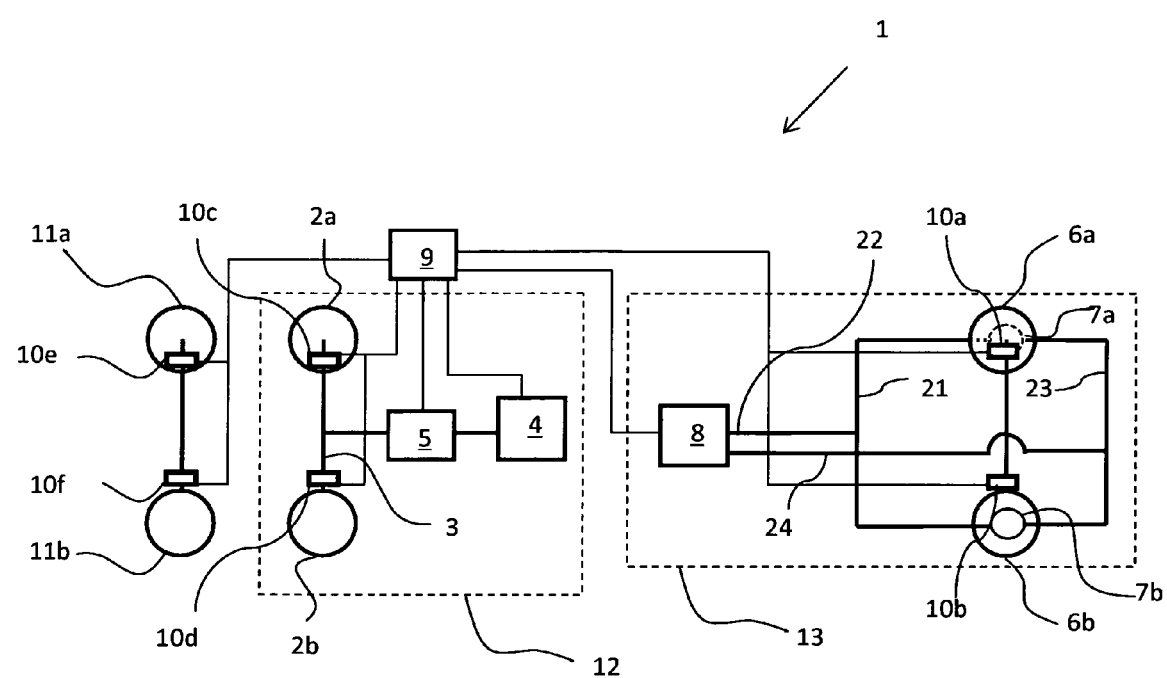
FIG. 1 shows a schematic representation of a first embodiment of a traction system according to the invention.

FIG. 1 shows a first embodiment of a traction system 1 according to the invention. The traction system 1 comprises a first, mechanical propulsion system 12 and a second hydraulic propulsion system 13.

The mechanical propulsion system comprises a pair of first traction wheels 2a, b (rear wheels). The rear wheels 2a, b are located on a driven rear axle 3, which is powered by an internal combustion engine (ICE) 4. The rear axle 3 is connected to the ICE 4 via a gearbox 5. The gear box 5 may be a stepped gear box and the mechanical drive train may comprise a Double Clutch Transmission (DCT) in order to reduce the time for a change of gear.

The hydraulic propulsion system 13 comprises a pair of independently rotatable, second traction wheels 6a, b (front wheels), which are driven by a pair of hydraulic motors 7a, b, which in turn are connected to and powered by a hydraulic pump 8.

The traction system 1 also comprises an electronic control unit (ECU) 9, which is connected to the ICE 4, the gearbox 5 and the hydraulic pump 8. Even though it is not necessary for the control unit 9 to be connected to the ICE 4 and the gearbox 5, it is considered to be beneficial for providing desired control of the hydraulic propulsion system 13. The control unit 9 could of course also be connected to other parts of the propulsion systems 12, 13, e.g. it may be connected to the hydraulic motors 7a, 7b in order to send output signals to control valves in the motors 7a, 7b. The control unit 9 is also connected to wheel speed sensors 10a-d in the mechanical and hydraulic propulsion systems 12, 13. Two first sensors 10c, d are located at a respective first traction wheel 2a, b in the mechanical propulsion system 12, and two second sensors 10a, b are located at a respective second traction wheel 6a, b in the hydraulic propulsion system 12. The sensors 10a-d are arranged to measure the wheel speeds of the first and second traction wheels 6a, b and 2a, b and transmit information to the control unit 9. The control unit is also connected to wheel speed sensors 10e, f, arranged to measure the wheel speeds of a pair of non-driven rear wheels 11a, b. Note that the sensors 10a-f can be replaced by or used together with other sensors (not shown) for measuring other types of parameters, e.g. drive torque or tire pressure.

Due to the separate hydraulic propulsion system 13, the wheel speeds of the second traction wheels 6a, b can be controlled independently of the wheel speeds of the first traction wheels 2a, b. However, a change may occur in the relation between the rolling radii of the first and second traction wheels 2a, b and 6a, b, for example caused by reduced tire pressure (sometimes deliberately reduced when driving on soft ground). A traction system that assumes that the rolling radii of the traction wheels remain constant over time may under such conditions experience undesirable wheel slip.

Figure 2:
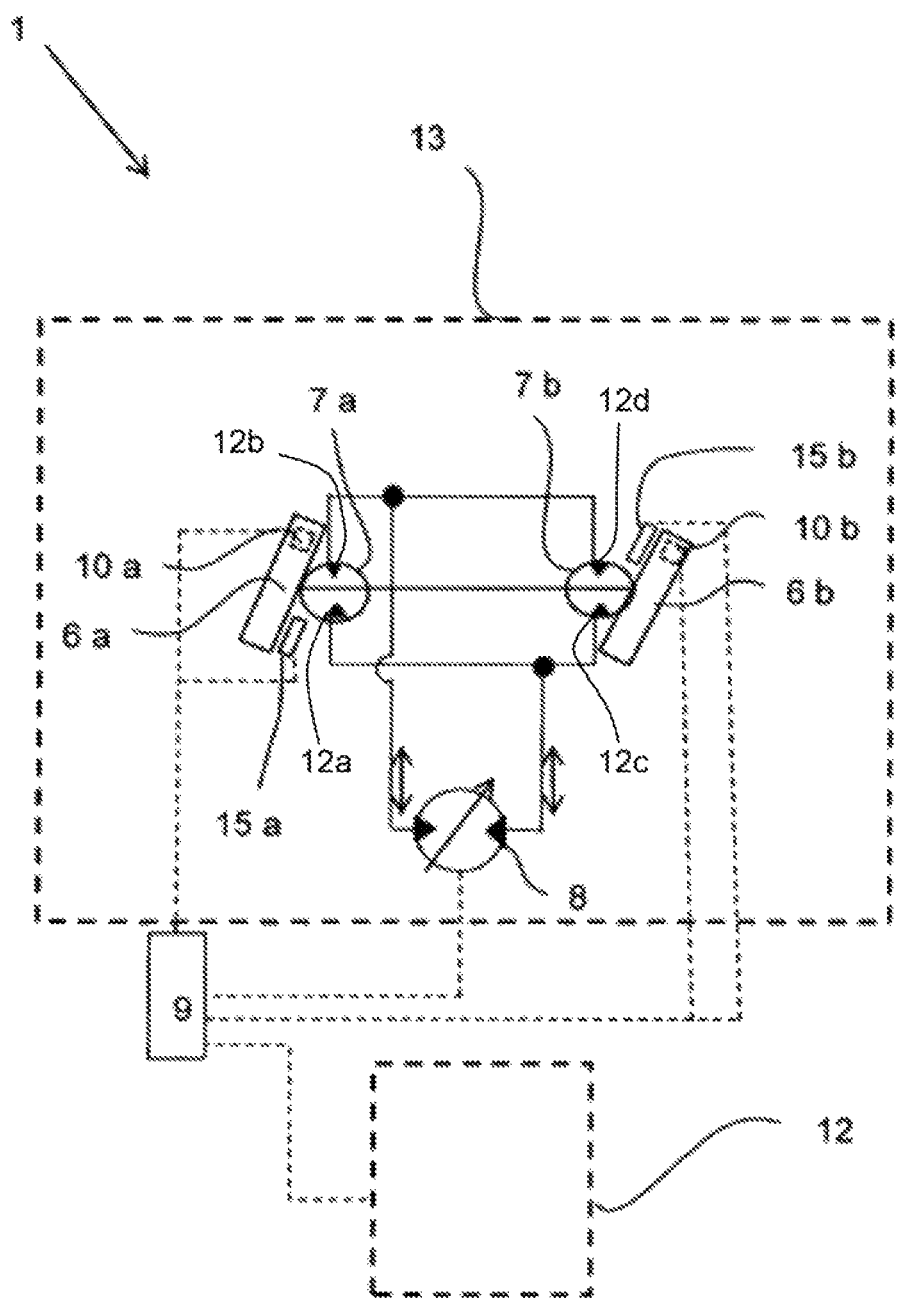
FIG. 2 shows a schematic representation of a hydraulic propulsion system incorporated into the traction system shown in FIG. 1.

The traction system 1 in FIG. 1 provides a solution to this problem. The wheel speed sensors 10a-d provide wheel speed information to the control unit 9. These measurements are carried out before the hydraulic propulsion system 13 is activated. The control unit 9 calculates a relation between the wheel speed of one second traction wheel 6a and a mean wheel speed of the first traction wheels 2a, b. This relation indicates the relation between the rolling radius of the second traction wheel 6*a* and the mean rolling radius of the first traction wheels 2*a, b*. When the hydraulic propulsion system 13 is activated, the control unit 9 sends an output signal, based on the determined relation, to the hydraulic pump 8 as well as control valves 12*a, b* (FIG. 2), to adjust the fluid pressure in the in the hydraulic wheel motor 7*a*, and thus the traction applied to the second traction wheel 6*a*, accordingly, so that the desired slip level (including no slip at all) or wheel speed is achieved. The traction applied to the other second traction wheel 6*b* is adjusted in a similar way, by means of the Control unit 9, the hydraulic, pump 8 and control valves 12*c, d* (FIG. 2).

In general, a torque from a hydraulic wheel motor may be controlled by a pump having a variable displacement (controlling the rotational speed of the hydraulic pump), having variable displacement of the motors or controlling the hydraulic, flow by by-pass valves or flow restrictors. Hence, there is a multitude of different ways of controlling the hydraulically driven wheels so as to provide a desired magnitude of the torque in the desired direction.

The traction system 1 of the vehicle may comprise further driven wheels (not shown), either included in the described propulsion systems 12,13 or being part of an additional, third propulsion system (not shown). However, an additional pair of wheels is preferably integrated in one of the already existing systems. For example, the non-driven rear wheels 11*a, b* and/or the front wheels powered by the hydraulic system may also be connected to the mechanical propulsion system 13. It is also obvious that hydraulic motors could be located, at any of the rear wheels 2*a, b* and 11*a, b* instead of or in addition to, being located at the front wheels 6*a, b*. Hence, the specific configuration may vary within the scope of invention as long as there is at least one wheel, or pair of wheels, connected to a first mechanical propulsion unit, such as a mechanical drive train powered by an ICE, and at least another wheel, or a pair of wheels, connected to another propulsion unit, powered by a hydraulic motor. An advantage with using a hydraulic system is that it is in general easier to implement an additional propulsion system onto non-powered wheels, in particular to steerable wheels, compared to adding an electric motor or providing the wheels with a mechanical drive.

As mentioned, an advantage with providing a vehicle with a main propulsion system 12 comprising a mechanical drive train powered by an ICE 4 and a secondary propulsion system 13 comprising hydraulic motors 7*a*, 7*b*, is that the mechanical propulsion system 12 provides efficient propulsion under normal driving conditions while the hydraulic propulsion system 13 may be used when there is a desire for an additional force, e.g. when driving on soft ground. It is in particular an advantage that at least a first pair of wheels 2*a, b* are powered by the mechanical drive train connected to ICE 4 while another, second wheel or wheel pair 6*a, b* is powered by a hydraulic motor or motors 7*a, b*. By using propulsion on several wheels 2*a, b* and 6*a, b*, the traction can be improved and there is less risk for wheel slip. It is particularly advantageous to provide the steerable front wheels 6*a, b* with the hydraulic propulsion system 13 since it is rather easy to fit in hydraulic hub motors compared to provide a mechanical driven axle, which is rather complicated for steerable axles, or using electric wheel motors, which in general are more bulky and heavier if the same torque is desired.

FIG. 2 shows a schematic representation of the hydraulic propulsion system 13 in FIG. 1.

As previously described, the vehicle comprises a pair of steerable, second traction wheels 6*a, b* mounted on a front axle. Each wheel 6*a, b* is drivingly connected to a respective hydraulic motor 7*a, b* and the hydraulic motors 7*a, b* are connected to a hydraulic circuit comprising a hydraulic pump 8. The pump 8 is in this system a reversible variable displacement pump connected in closed loop configuration. More specifically, the wheel motors 7*a, b* are connected to one another by means of parallel first and third conduits 21, 23. The first conduit 21 is in turn connected to the hydraulic pump 8 by means of a second conduit 22 and the third conduit 23 is connected to the hydraulic pump 8 by means of a fourth conduit 24. The pump 8 may be driven directly by the ICE. Hence, the pump 8, which is controlled by the Electronic Control Unit (ECU) 9, may be controlled to control the magnitude of the flow by changing its displacement.

The wheel speeds of the second traction wheels 6*a, b* can be individually adjusted. For this purpose, the hydraulic propulsion system 1 comprises four control valves 12*a-d* (FIG. 2), controlled by the control unit 9. Two valves 12*a, c* are attached to the first conduit 21 and located at a respective hydraulic wheel motor 7*a, b*, and two valves 12*b, d* are attached to the third conduit 23 and located at a respective hydraulic wheel motor 7*a, b*. Each control valve 12*a-d* controls the flow of fluid to or from their corresponding wheel motor 7*a, b*. Thus, they control the fluid pressure in said wheel motors 7*a, b* and the tractions applied to the corresponding second traction wheels 6*a, b*. This arrangement allows the control unit 9 to control the traction applied to the second traction wheels 6*a, b* individually. Other embodiments may incorporate more or fewer control valves.

In an alternative embodiment, in order to keep the hydraulic traction system as simple as possible, the hydraulic propulsion system may be devised so that both motors receive hydraulic fluid at the same pressure, i.e. no valves or restrictors are present in the system. One advantage with this arrangement is that there will be automatic compensation for differences between the rolling radii of the second traction wheels. For example, during cornering, the same pressure will be present in both hydraulic wheel motors and the same torque will be provided to both second traction wheels.

In order to avoid a loss of traction from the hydraulically powered second traction wheels 6*a, b* due to wheel slip, which may cause a power loss for both second traction wheels 6*a, b* in a parallel arrangement, the control unit 9 may be connected to a pair of front wheel brakes 15*a*, 15*b* for control of their braking operation. A wheel slip may for example be detected by comparing the wheel speeds of the hydraulically powered second traction wheels 6*a, b*. The comparison may include corrections for the wheel speed difference due to a turning action of the vehicle.

One embodiment of the method for controlling the traction system shown in FIGS. 1 and 2 is carried out as follows.

The hydraulic system 1 is activated either manually by the driver or automatically in response to detection means identifying specific driving conditions (for example when driving in a straight line on low torque).

Before the activation of the hydraulic propulsion system 13, the first and second sensors 10*a-d* measure wheel speeds indicative of the rolling radii of the first and second traction wheels 2*a, b* and 6*a, b*. This information is transmitted to the control unit 9.

Thereafter, the control unit 9 calculates a mean wheel speed for the first traction wheels 2*a, b* and determines a present relation between the wheel speed of one of the second traction wheels 6*a* and the mean wheel speed of the first traction wheels 2*a, b*.

The control unit 9, following activation of the hydraulic propulsion system 13, uses this present relation to determine the traction to be applied to the second traction wheel 6a and sends an output control signal to the hydraulic pump 8 and the control valves 12a, b, which adjust the traction applied to the second traction wheel 6a accordingly, so that a desired slip level or wheel speed is achieved.

A similar procedure is carried out for the other second traction wheel 6b.

The method may also comprise steps for identifying wheel speeds that deviate too much from an expected wheel speed or mean wheel speed. These deviating wheel speeds are discarded. The heavy road vehicle 1 may comprise means (not shown) for alerting the driver to a deviating wheel speed, advantageously identifying the deviating traction wheel and the rolling radius and/or tire pressure of said traction wheel.

The scope of protection is not limited to the above described embodiments, which in any case can be combined in many different ways.

The method described above compares a wheel speed for a second traction wheel with a mean wheel speed for a plurality of first traction wheels. In another embodiment, the method may comprise the step of calculating a mean wheel speed for the second traction wheels. The method may also comprise the step of applying the same traction to more than one traction wheel. Another embodiment of the method may comprise the step of adapting the traction applied to the first traction wheels to a change in the relation between the rolling radii of the first and second traction wheels. It is also possible to use sensors that measure other parameters instead of or in addition the wheel speed sensors. Finally, the vehicle may comprise a plurality of non-driven wheels. These wheels can be provided with sensors for measuring first and/or second parameter values and these parameter values can be included in the method described above and below.

The invention claimed is:

1. A method for controlling a traction system for a heavy road vehicle, the traction system comprising:
    a first mechanical propulsion system comprising at least one first traction wheel;
    a second hydraulic propulsion system comprising at least one second traction wheel; and
    a control unit for controlling traction applied to the second traction wheel;
the method comprising:
    measuring via at least one first sensor a first parameter value indicative of a rolling radius of the first traction wheel;
    transmitting the first parameter value to the control unit;
    measuring via at least one second sensor a second parameter value indicative of a rolling radius of the second traction wheel;
    transmitting the second parameter value to the control unit;
    determining via the control unit and using the first and second parameter values a present relation between the rolling radii of the first and second traction wheels in order to identify a change in the relation between the rolling radii of the first and second traction wheels; and
    providing via the control unit an output signal based on the present relation such that the control unit takes into account the change in the relation between the rolling radii of the first and second traction wheels to optimize the traction applied to the second traction wheel of the hydraulic propulsion system,
    wherein, a slip of at least one of the first and second traction wheels occurs in response to the optimization of the traction applied to the second traction wheel.

2. The method according to claim 1, comprising:
    measuring via at least one additional first sensor an additional first parameter value indicative of a rolling radius of an additional first traction wheel; and
    the control unit using a mean value of the first parameter value and the additional first parameter value.

3. The method according to claim 1, comprising:
    measuring via at least one additional second sensor an additional second parameter value indicative of a rolling radius of an additional second traction wheel; and
    the control unit using a mean value of the second parameter value and the additional second parameter value.

4. The method according to claim 1, wherein the optimized traction is applied to more than one second traction wheel.

5. The method according to claim 1, wherein the first and second parameter values relate to parameters including one or more of gross weight, tire pressure, wheel speed, and drive torque of a traction wheel.

6. The method according to claim 5, wherein the steps of measuring the first and second parameter values include measuring more than one parameter of the parameters and using the more than one measured parameter for determining a present relation between the rolling radii of the first and second traction wheels.

7. The method according to claim 1, wherein the second propulsion hydraulic system further comprises:
    at least two second traction wheels, each second traction wheel drivingly connected to a respective hydraulic, wheel motor;
    a hydraulic pump for powering the hydraulic wheel motors;
    a first conduit connecting the hydraulic wheel motors, the first conduit being in fluid connection with the hydraulic pump by means of a second conduit;
    a third conduit connecting the hydraulic wheel motors, the third conduit being in fluid connection with the hydraulic pump by means of a fourth conduit;
the method comprising the step of:
    transmitting output signals from the control unit to the hydraulic pump to optimize traction applied to the second traction wheels.

8. The method according to claim 7, wherein the second propulsion hydraulic system comprises a plurality of control valves, the method comprising the step of each control valve controlling the traction applied to a respective second traction wheel in response to output signals from the control unit.

9. A traction system for a heavy road vehicle, the traction system comprising:
    a first mechanical propulsion system comprising at least one first traction wheel and a mechanical drivetrain including an internal combustion engine, which provides traction to the first traction wheel via a gear box;
    a second hydraulic propulsion system comprising at least one second traction wheel;
    the traction system further comprises a control unit for controlling traction applied to the second traction wheel, which control unit:
        is arranged to receive a first parameter value from at least one first sensor, which first parameter value is indicative of a rolling radius of the first traction wheel;

is arranged to receive a second parameter value from at least one second sensor, which second parameter value is indicative of a rolling radius of the second traction wheel;

is arranged to use the first and second parameter values for determining a present relation between the rolling radii of the first and second traction wheels in order to identity a change in the relation between the rolling radii of the first and second traction wheels; and is arranged to provide an output signal based on the present relation such that the control unit takes into account the change in the relation between the rolling radii of the first and second traction wheels for optimizing the traction applied to the second traction wheel, wherein, a slip of at least one of the first and second traction wheels occurs in response to the optimization of the traction applied to the second traction wheel.

10. The traction system according to claim 9, comprising at least one additional first sensor for measuring an additional first parameter value indicative of a rolling radius of an additional first traction wheel, wherein the control unit is adapted to use a mean value of the first parameter value and the additional first parameter value in determining the present relation.

11. The traction system according to claim 9, comprising at least one additional second sensor for measuring an additional second parameter value indicative of a rolling radius of an additional second traction wheel, wherein the control unit is adapted to use a mean value of the second parameter value and the additional second parameter value in determining the present relation.

12. The traction system according to claim 9, wherein the optimized traction is applied to more than one second traction wheel.

13. The traction system according to claim 9, wherein the first and second parameter values relate to parameters including one or more of gross weight, tire pressure, wheel speed, and drive torque of a traction wheel.

14. The traction system according to claim 13, wherein more than one parameter of the parameters is used for determining a present relation between the rolling radii of the first and second traction wheels.

15. The traction system according to claim 9, wherein the second hydraulic propulsion system comprises:
at least two second traction wheels, each second traction wheel drivingly connected to a respective hydraulic wheel motor;
a hydraulic pump for powering the hydraulic wheel motors;
a first conduit connecting the hydraulic wheel motors, the first conduit being in fluid connection with the hydraulic pump by means of a second conduit;
a third conduit connecting the hydraulic wheel motors the third conduit being in fluid connection with the hydraulic pump by means of a fourth conduit; and
wherein the hydraulic pump is arranged to receive output signals from the control unit and in response to the output signals optimize the traction(s) applied to the second traction wheels.

16. The traction system according to claim 9, the traction system comprising a plurality of control valves, wherein each control valve is arranged to control the traction applied to a respective second traction wheel in response to output signals from the control unit.

17. A heavy road vehicle comprising:
a traction system, the traction system comprising
a first mechanical propulsion system comprising at least one first traction wheel and a mechanical drivetrain including an internal combustion engine, which provides traction to the first traction wheel via a gear box,
a second hydraulic propulsion system comprising at least one second traction wheel,
the traction system further comprises a control unit for control hug traction applied to the second traction wheel, which control unit,
is arranged to receive a first parameter value from at least one first sensor, which first parameter value is indicative of a rolling radius of the first traction wheel,
is arranged to receive a second parameter value from at least one second sensor, which second parameter value is indicative of a rolling radius of the second traction wheel,
is arranged to use the first and second parameter values for determining a present relation between the rolling radii of the first and second traction wheels in order to identify a change in the relation between the rolling radii of the first and second traction wheels, and
is arranged to provide an output signal based on the present relation such that the control unit takes into account the change in the relation between the rolling, radii of the first and second traction wheels for optimizing the traction applied to the second traction wheel, wherein, a slip of at least one of the first and second traction wheels occurs in response to the optimization of the traction applied to the second traction wheel.

* * * * *